May 21, 1929. H. W. KULP 1,713,763
VALVE SPRING LIFTER AND COMPRESSOR
Original Filed March 5, 1925
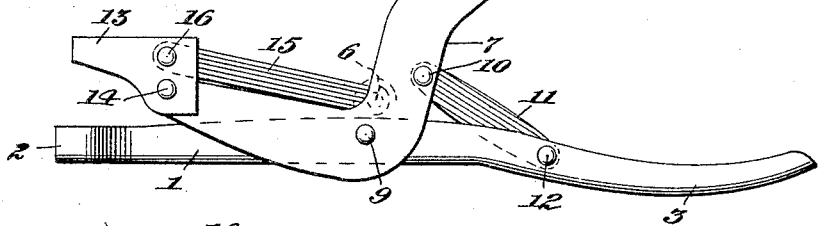
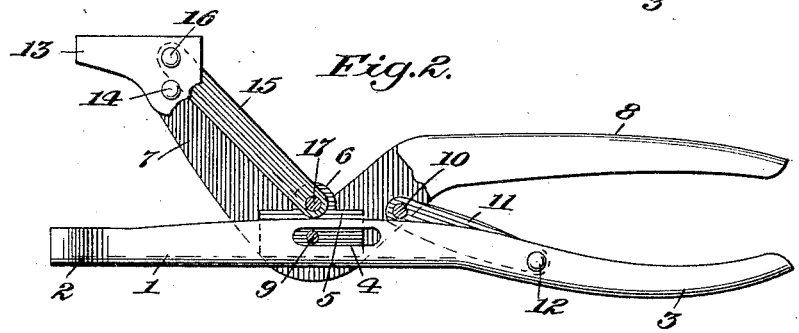
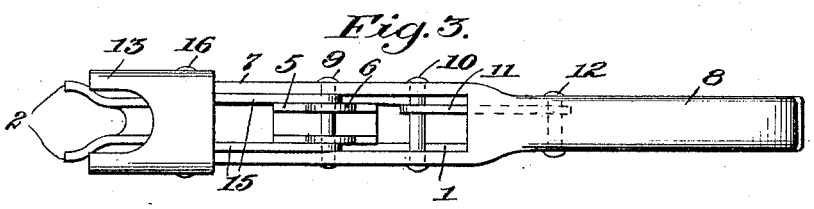
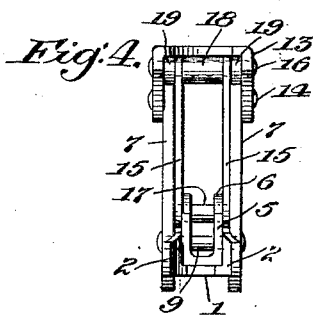
Inventor:
Harry W. Kulp,
by Wm H Babcock & Son
Att'ys.

Patented May 21, 1929.

1,713,763

UNITED STATES PATENT OFFICE.

HARRY W. KULP, OF LANCASTER, PENNSYLVANIA, ASSIGNOR OF ONE-HALF TO MARTIN C. DELLINGER, OF LANCASTER, PENNSYLVANIA.

VALVE-SPRING LIFTER AND COMPRESSOR.

Application filed March 5, 1925, Serial No. 13,251. Renewed October 10, 1928.

This invention relates to valve spring lifters. Devices of this general class are designed more especially for use in freeing the stems of the valves of internal combustion engines from their springs so that they may be ground, or so that they may be removed, and in order to so free the valve stems it is necessary to compress and lift the lower portion of the valve spring so that the pin or other spring holding means may be removed from the stem.

The objects of the present invention are to provide a heavy duty spring lifter or compressor tool which is operated by the closing of the operator's hand; to provide in such a device means for increasing, by a supplemental sliding lever construction, the power applied to the handles 8 and 3 so that the requisite power to compress and lift the lower ends of powerful valve springs such as used on the larger commercial automobile trucks and some tractors and powerful passenger cars may be attained without need for increasing the length of the main levers or handles or otherwise increasing or changing its size, bulk or shape in any manner such as to render it clumsy or difficult to manipulate with one hand; to provide for keeping the operative jaws of the tool substantially in registry in a vertical direction and to maintain them substantially parallel to each other throughout their range of relative movement toward and away from each other in order that the spring being acted upon will be acted upon evenly on all sides in a line parallel with the valve stem; and to increase the durability of such devices while maintaining economy of material and labor of assembly in their manufacture in order that they may be sold at a reasonable price.

The device of this present invention is especially designed for, and intended for use in connection with, the more powerful valve springs such as commonly used in the larger and more powerful internal combustion engines for the larger commercial trucks and tractors, though it may also, of course, be used in connection with the less powerful springs of the average passenger automobile engine.

Likewise, it may be provided with any suitable locking means for automatically, or otherwise, locking it in operation against the action of the spring compressed, for instance, with the locking means shown in the patent to Kulp & Dellinger No. 1,461,275, granted July 10, 1923.

In the accompanying drawings illustrating but one embodiment of my invention simply by way of example as by law required:

Figure 1 represents a side elevation of a device embodying my invention in one extreme position;

Figure 2, a similar view thereof in the other extreme position, and partially broken away;

Figure 3, a top plan view of the device with the parts in the position of Fig. 2; and Figure 4, a front elevation of the device with the parts in the position of Fig. 2.

Referring now in detail to the drawings, 1 indicates a straight channel, preferably stamped heavy sheet metal bar or lever having a forked or bifurcated operative front end or jaw 2, and being continued in a slightly offset curved handle or hand grip 3.

The sides of the lever 1 intermediate their ends are provided each with a slot 4, the slot 4 in the one side being of the same size and shape as the slot 4 in the other side, and the two slots 4 being in registry in a lateral direction at right angles to the longitudinal axis of lever 1, said slots 4 being provided in order that the connecting rivet rod or pin 9 may have free movement without obstruction.

The side walls of the handle or grip 3, which is a continuation of the lever 1, are perforated in their forward portions to receive the anchoring rivet pin 12.

A sheet metal slide 5 corresponding in cross-sectional exterior contour to the internal cross-sectional contour of the lever 1, and of such size as to fit between the sides thereof and make a freely sliding fit between the sides and bottom thereof substantially in contact with such faces is slidably mounted therein so as to lie mostly between the slots 4 and to have sliding motion lengthwise of the lever 1 at such portion thereof and is perforated in both sides for the passage of the said rivet pin or rod 9.

Also, the slide 5 will be of substantial length as shown, being in length preferably approximately three times its width to ensure a long sliding bottom face and sides, guarding against twisting or canting or any tendency to bind or stick against or between the opposed faces of the lever 1 under stress of actual use.

The slide 5 may have the medial portions of the upper portions of its sides continued up in perforated lugs or ears 6 as shown, or the entire side portions of the slide 5 may be made higher, according to preference.

A bell-crank lever 7 having bell-crank legs straddling the lever 1, and having its normally long arm deflected at an angle into a handle or hand-grip 8, has its legs connected together and to the slide 5, and slidably to the lever 1, by the rivet pin or rod 9 which passes through the said legs at the point of the angle where the long and short arms of the bell-crank lever merge and serves as a sliding fulcrum for said lever 7, the ends of said rivet pin 9 being riveted over or spread against the adjacent portions of the outer faces of the respective legs of said bell-crank lever 7. Said rivet 9 passes through the lower perforations in the sides of slide 5 and makes a snug fit in said perforations, as well as in the perforations in the legs of bell-crank lever 7 to avoid any loss of motion, and extends through the slots 4 in the respective sides of the lever 1 and has sliding motion in said slots in accordance with the movement of the slide 5 and the sliding pivotal movement of the bell-crank lever 7.

The normally long deflected arm of the lever 7 is provided in its side portions or legs with perforations which register in a lateral direction taken at right angles to the axis of said legs, which perforations are so located as to be at all times throughout the range of movement of the parts at a higher point than the rods or rivets 9 and 12, and a rivet pin or rod 10 passing through said perforations and a registering perforation in the upper and forward end of a supplemental straight arm or lever 11 serves to permanently and pivotally connect the forward end of said lever 11 and said bell-crank lever 7 together. The lower and rear end portion of lever 11 may be permanently pivotally connected to the handle 3 of lever 1 in the manner shown, that is to say, by means of the rivet pin 12, which passes through the perforations in the sides of the handle 3 and a registering perforation in the lower and rear end portion of the lever 11.

The rivet pins 10 and 12 will preferably make a snug fit between the walls of their respective perforations in the lever 7 and lever 11 and in the handle 3 and lever 11 respectively in order to avoid lost motion as much as possible.

From the foregoing it will be apparent that movement of the handle 8 toward the handle 3 will result in a slight forward motion of the bell-crank lever 7 as a whole, such forward motion being so calculated as to insure the movement of the pivot pin rivet 14 in a straight or substantially straight vertical line, such forward movement being caused by the push of the lever 11 as its end portions approach the horizontal from the vertical, so increasing the distance, longitudinally of the device, between the pins 10 and 12, such movement of the handle 8 also resulting in the turning of the bell-crank lever 7 as a whole about its sliding fulcrum pin 9, and so moving the jaw 13 away from the jaw 2, this construction giving a very sturdy and powerful device which is, however, of convenient size, shape and construction so as to be especially adapted for manipulation with one hand only.

Taking up now the jaw construction and the means whereby they are maintained substantially parallel and substantially in registry in a vertical plane throughout the range of their relative movement, the jaw 2 may be integral with, and immovable with relation to, the lever 1 as shown and as above described, but the jaw 13 is a plate pivotally mounted, preferably as shown, on the front end portions of the legs of the bell-crank lever 7, and for this purpose it will have depending perforated preferably integral vertical sides which fit against the outer faces of the legs of said bell-crank lever 7, and a pivot pin 14 snugly fitting in and passing through the perforations in said sides of the jaw 13 and in registering perforations in the intervening portions of the bell-crank lever 7 serves to permanently pivotally connect the jaw 13 and the front end portions of the legs of the bell-crank lever 7.

In order that said jaws 13 may at all times under conditions of use be maintained in substantially parallel relation to jaw 2 I provide a radius rod, or preferably two radius rods 15, as shown, the respective ends of which are pivotally connected to the jaw 13 by means of a rivet pin 16 and pivotally to the lugs or ears 6 of the slide 5 by means of the rivet pin 17.

The upper and front ends of the radius rods 15 preferably are held properly spaced from each other by any suitable means, such as a spacing sleeve 18, and preferably are held properly spaced from the adjacent faces of the jaw 13 by any suitable means, such as spacing washers or short sleeves 19, and their rear and lower ends are held closely adjacent the outer faces of the lugs 6 by their connecting rivet pin 17 and so held in proper position.

The pivot pins 9 and 17 are so arranged and held by the material of slide 5 and its preferably integral lugs or ears 6 that their axes will be parallel and will at all times lie in the same vertical plane, so that as the slide moves lengthwise of the lever 1 in accordance with the relative movement of the handles 8 and 3 the radius rods 15 will change their positions from the extreme shown in Fig. 1 to the extreme shown in Fig. 2 to at all times maintain the parallel axes of the rivet pins 14 and 16 in the same, preferably vertical, plane as shown in Figs. 1 and 2 whereby the operative face of pivoted jaw 13 will always be maintained in the same relative position to the rigid jaw 2 throughout the range of relative movement of the levers 1 and 7 as the jaw 13 moves away from or toward the jaw 2.

Obviously the invention is susceptible of various departures and modifications of details from the construction shown in the accompanying drawing.

Having thus described my invention, what I claim as new and desire to secure by Letters Patent is:

1. In a valve spring compressor, a lever, and a jaw carried by said lever, said lever being formed with a slot, in combination with an angular lever, means passing through said angular lever substantially at the intersection of its angles and through the slot in the other lever to slidably and pivotally connect said levers together, a supplemental lever connected to said angular lever to the rear of, and above, said means and to the first mentioned lever to the rear of, and below, the point of connection of said supplemental lever to said angular lever, and a jaw pivotally mounted on said angular lever, the relation of said levers and said supplemental lever being such that said jaws will be maintained substantially in registry throughout the range of relative movement of said levers.

2. In a valve spring compressor and lifter, a lever, a jaw carried by said lever, and a slide mounted for longitudinal reciprocatory movement with relation to said lever, in combination with a sliding lever pivotally connected to said slide, a movable jaw mounted on said sliding lever, and means associated with said slide and movable jaw for maintaining said movable jaw substantially parallel to the first mentioned jaw throughout the range of movement of said levers.

3. In a valve spring lifter and compressor, a lever, a jaw carried by said lever, and a reciprocatory element, in combination with a sliding lever slidably and pivotally connected to said first mentioned lever, a movable jaw mounted on said sliding lever, means for transmitting motion from said sliding lever to said element to cause it to move in accordance with the movement of the latter, and means associated with said element and said movable jaw for maintaining said movable jaw substantially parallel to the first mentioned jaw throughout the range of relative movement of said levers.

4. In a valve spring lifter and compressor, a lever, a jaw carried by said lever, and a reciprocatory element, in combination with a sliding lever slidably and pivotally connected to said first mentioned lever, a movable jaw mounted on said sliding lever, means for causing said element to move in accordance with the relative movement of said levers, and means associated with said element and said movable jaw for maintaining said movable jaw substantially parallel to the first mentioned jaw throughout the range of relative movement of said levers.

5. In a valve spring lifter and compressor, a lever, a jaw carried by said lever, and a reciprocatory element, in combination with a sliding lever slidably and pivotally connected to said first mentioned lever, a movable jaw mounted on said sliding lever, means for causing said element to move in accordance with the relative movement of said levers, means associated with said element and said movable jaw for maintaining said movable jaw substantially parallel to the first mentioned jaw throughout the range of relative movement of said levers, and a supplemental lever pivotally connected to each of said levers to force the sliding lever longitudinally of the first mentioned lever as said sliding lever turns about its pivot.

6. In a valve spring lifter and compressor, a slotted lever, a jaw carried by said lever, and a slide, in combination with an angular lever, means extending through said angular lever and the slots of the intervening portion of said slotted lever and through said slide for permanently connecting said parts together, a movable jaw mounted on said angular lever, and means pivotally connected to said movable jaw and said slide for maintaining said movable jaw substantially parallel to the first mentioned jaw throughout the range of relative movement of said levers, the said slide being mounted on said first mentioned lever for reciprocatory movement with relation thereto.

7. In a valve spring lifter and compressor, a lever, a jaw carried by said lever, and a reciprocatory element, in combination with a sliding lever slidably and pivotally connected to said first mentioned lever, a movable jaw mounted on said sliding lever, means for causing said element to move in accordance with the relative movement of said levers, means associated with said element and said movable jaw for maintaining said jaws substantially parallel to each other throughout the range of relative movement of said levers, and means for causing relative sliding movement between said levers.

In testimony whereof, I have signed my name to this specification at Lancaster, Pennsylvania, this 3rd day of March 1925.

HARRY W. KULP.